Dec. 6, 1932.  R. H. McCONAHAY  1,890,159
WELL DEPTH MEASURING DEVICE
Filed April 9, 1930
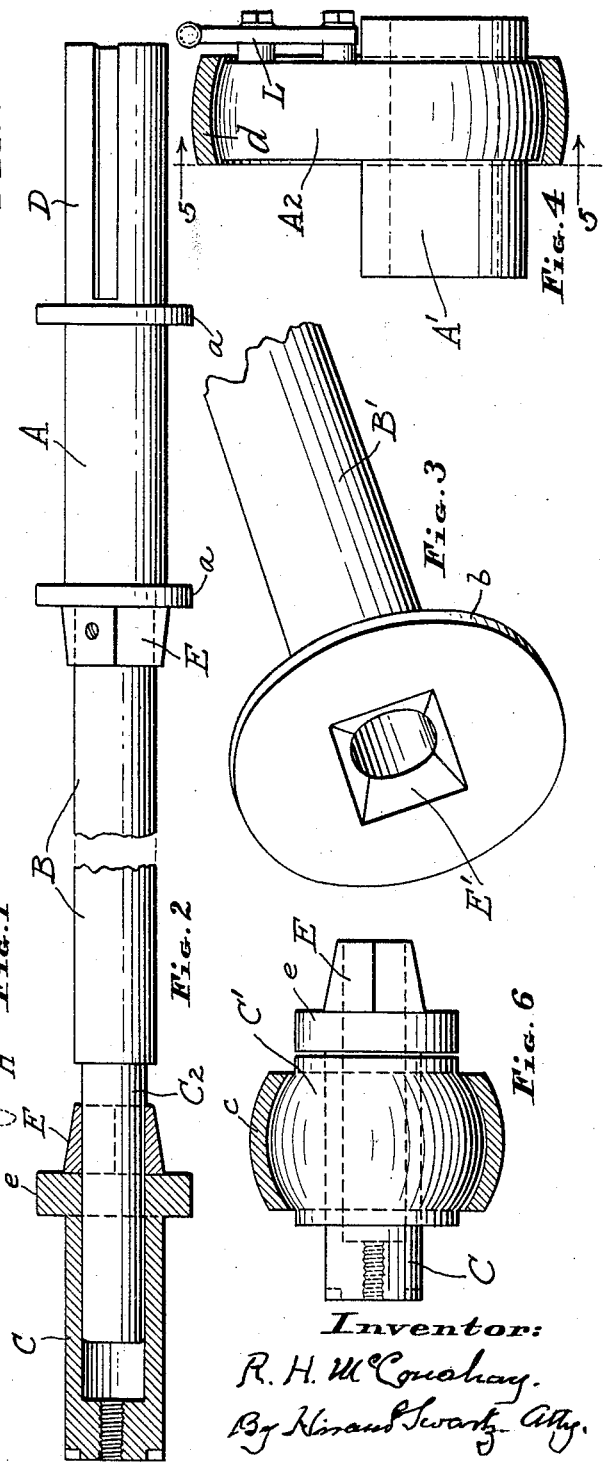
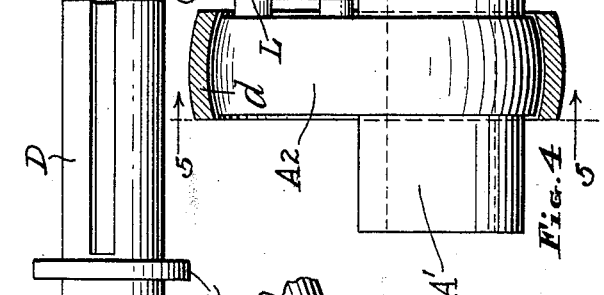
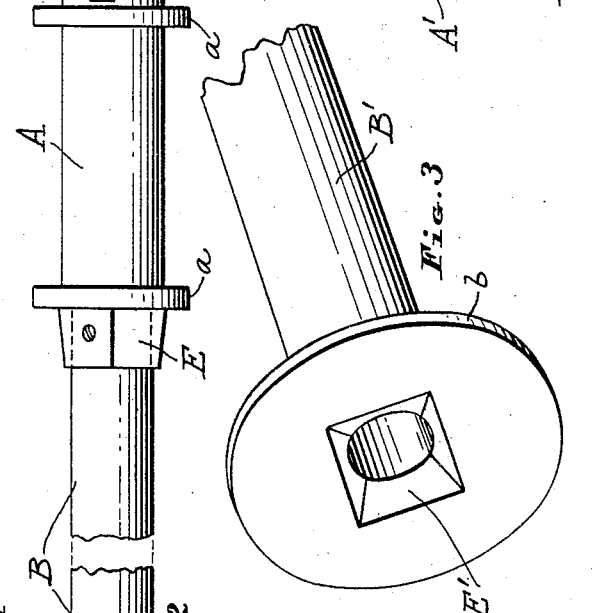
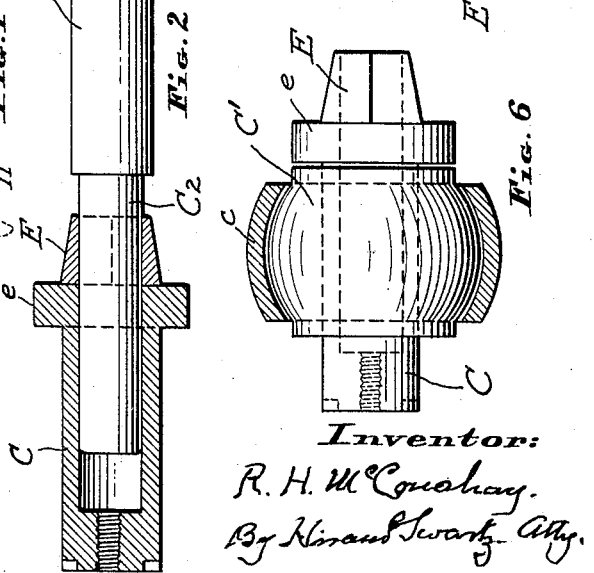
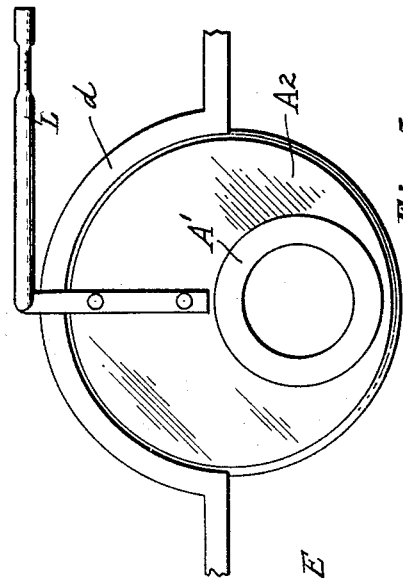
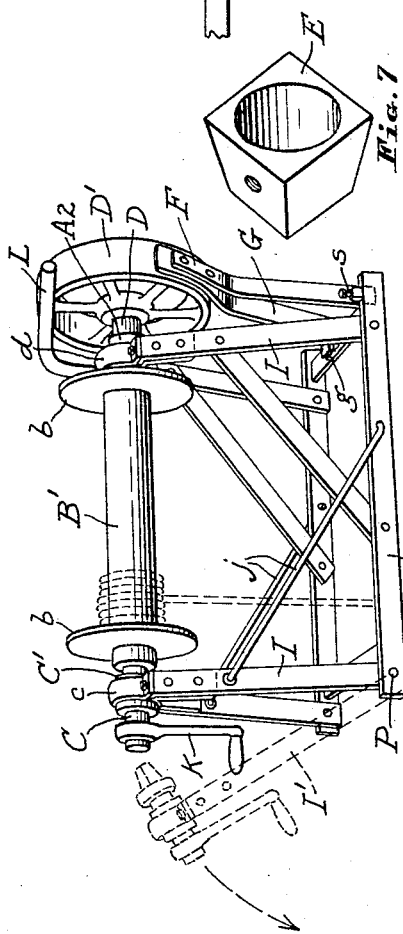
Inventor:
R. H. McConahay.
By Hiram Swartz Atty.

Patented Dec. 6, 1932

1,890,159

UNITED STATES PATENT OFFICE

RAY H. McCONAHAY, OF WOOSTER, OHIO, ASSIGNOR OF ONE-HALF TO B. W. HAMMETH

WELL-DEPTH MEASURING DEVICE

Application filed April 9, 1930. Serial No. 442,967.

My invention relates to improvements in well-depth measuring devices, and more particularly, to such as are intended to measure the depth of deep drilled gas and oil wells and the like. Its object is to provide simple and inexpensive mechanism for measuring the depth of such wells by the use of a measuring line or cable let down into and withdrawn therefrom mechanically, and means for reversing the movement thereof without changing the position of the operating mechanism, and for removing the spool on which the cable is wound, and for shifting it end for end, and means for reversing the brake on the spool shaft, and for adjusting it thereon,—all as hereinafter fully set forth and stated in the appended claims.

My invention is illustrated by the accompanying drawing in which similar letters and figures of reference indicate like parts. Referring thereto, Fig. 1 is a side perspective view of my well depth measuring machine; Fig. 2 is a side view of the spool shaft showing also parts connected therewith in section, and broken apart near its center; Fig. 3 is a portion of the spool, showing the means for sustaining and driving it on the spool shaft; Fig. 4 is a side view of the eccentric for shifting the drive end of the said shaft; Fig. 5 is a detached view of the same on the dotted line 5—5 of Fig. 4; Fig. 6 is a detached view of the bearing on the opposite end of the shaft, showing the enclosing strap thereof in section, and Fig. 7 is a detached view in detail of the block used for driving and sustaining the spool thereon.

In the drawing A indicates the axle on which the eccentric A', A2 (Fig. 4) is mounted between the thrust washers $a$, $a$, shown in Fig. 2. B is the spindle on which the spool B', shown in Fig. 3, is removably mounted; and C is a sleeve member which is rotatably and removably mounted on the reduced spindle C2 on the outer end of the shaft B, as shown in Fig. 2; D' is a friction drive pulley mounted on the outer end of the shaft D; and E indicates a pair of rectangular and wedge shaped blocks which fit snugly into the corresponding rectangular cavities E', one of which blocks is secured on the shaft against the thrust washer $a$, and adapted to rotate the spool B'; and the other block is integral with the inner end of the sleeve C, and adapted to rotate the bearing C' within the support $c$, as shown in Fig. 6. The spool shaft and bearings are mounted on a suitable framework H, as shown in Fig. 1, and may be made in modified form as may be required to support the drive pulley and the shaft in proximate relation to a drive or flywheel on an adjacent derrick or the like, (not shown), to be driven by friction thereon, in the usual well known way.

In order to unwind the spool and thus let the depth measuring cable down into the well to determine its depth, the friction pulley D' is brought into contact with the brake F adjacent the drive wheel by means of a hand lever L which is secured to and actuates the eccentric A2, as shown in Figs. 4 and 5, and thereby draws said pulley in that direction; and in order to withdraw the cable from the well it is necessary to reverse the rotation of the spool, and I accomplish this by rocking said eccentric in the opposite direction by said lever L, thereby causing the spool to rotate in the opposite direction. To accomplish this movement the spool B' is rotatable from either end thereof by means of like terminal cavities E' therein, adapted to engage corresponding rectangular tapering blocks E at opposite ends of the spool, when mounted on the spindle B, as shown in Fig. 2. To provide for removing the spool from the shaft, the outer standards I are pivotally connected to the base of the frame H, and the guy rods, $j$, $j$, are withdrawn therefrom, thereby permitting the said standards, and with them the sleeve C (as shown in dotted lines in Fig. 1) to be folded outwardly sufficiently to allow the spool to be shifted as aforesaid. To provide for shifting the position of the machine frame so that the opposite side of the drive pulley D' may engage the flywheel on the derrick or similar mechanism, it is necessary to also shift the brake member F to the opposite side of the pulley, and this I accomplish by simply reversing the leg G to the opposite side of the frame H by withdrawing the pintle $g$ on which it is pivoted to the frame. Adjustment of the brake F to proper position near the pulley surface is made by means of a set screw *s* at the bottom of the leg in the usual well known way. The vibratory bearing C' within the band C allows enough rocking therein to permit shifting the frame I'.

I claim:

1. In a device of the character described, the combination with a frame, of a drive shaft rotatably mounted thereon, an eccentric mounted on said shaft, a bearing for said eccentric adapted to permit a limited sidewise and tilting movement of said shaft thereon, a pair of tapered drive-blocks mounted on said shaft, one of them being secured thereto adjacent said eccentric axis, a sleeve removably mounted on the opposite end of said shaft, in operative engagement with the other of said pair of tapered blocks, a bearing for said shaft adapted to allow a tilting movement thereof within said bearing, means for withdrawing said sleeve and bearing from said shaft, a spool mounted removably on said shaft, said spool having tapered cavities at each end fitted to engage said tapered drive blocks, respectively for the reversal endwise of said spool, a pulley mounted on said shaft to drive the latter, a brake to stop said pulley, and means for shifting said eccentric laterally to move said shaft and pulley laterally, substantially as set forth.

2. In a device of the character described, the combination with a frame, of a drive shaft rotatably mounted thereon, a drive pulley on said shaft, an eccentric on said shaft adjacent said pulley, a bearing for said eccentric adapted to permit the latter to oscillate therein, a sleeve removably mounted on the outer end of said shaft, a bearing for said sleeve adapted to permit the latter to oscillate therein, a tapered block on the inner end of said sleeve, a tapered block secured on said shaft adjacent said eccentric, a spool removably and reversibly mounted on said shaft between said pair of tapered blocks, and means for manually withdrawing said sleeve from said shaft to permit the withdrawal of said spool therefrom and its reversal thereon, substantially as set forth.

In witness whereof, I hereunto set my hand this 28 day of December, A. D. 1929.

RAY H. McCONAHAY.